(12) United States Patent
Schmidt et al.

(10) Patent No.: US 7,630,180 B2
(45) Date of Patent: Dec. 8, 2009

(54) MOTOR STARTER CIRCUIT

(75) Inventors: Claus Schmidt, Odense (DK); Hans Peter Kristensen, Aabenraa (DK)

(73) Assignee: Danfoss Compressors GmbH, Flensburg (DE)

( * ) Notice: Subject to any disclaimer, the term of this patent is extended or adjusted under 35 U.S.C. 154(b) by 270 days.

(21) Appl. No.: 11/740,329

(22) Filed: Apr. 26, 2007

(65) Prior Publication Data

US 2007/0253133 A1 Nov. 1, 2007

(30) Foreign Application Priority Data

Apr. 28, 2006 (DE) .................. 10 2006 021 256

(51) Int. Cl.
*H02H 7/08* (2006.01)
(52) U.S. Cl. .................. 361/28; 361/23; 361/33; 318/727; 318/805; 318/785; 318/786; 318/751
(58) Field of Classification Search ............. 361/23, 361/33; 318/727, 805, 785, 786, 751
See application file for complete search history.

(56) References Cited

U.S. PATENT DOCUMENTS

| | | | |
|---|---|---|---|
| 3,562,587 A | | 2/1971 | Forst |
| 3,668,489 A | * | 6/1972 | Erdman ................. 318/806 |
| 3,766,457 A | * | 10/1973 | Fink et al. ............. 318/786 |
| 3,792,324 A | | 2/1974 | Suarez et al. .......... 318/221 |
| 3,803,866 A | * | 4/1974 | Barry ..................... 62/230 |
| 4,022,598 A | | 5/1977 | Gucwa, Jr. et al. |
| 4,119,884 A | | 10/1978 | Blumenberg et al. |
| 4,366,426 A | | 12/1982 | Turlej ................... 318/786 |
| 4,378,520 A | * | 3/1983 | Ford ..................... 318/789 |
| 4,455,521 A | * | 6/1984 | Day et al. .............. 318/798 |

(Continued)

FOREIGN PATENT DOCUMENTS

DE  197 35 552  2/1999

(Continued)

OTHER PUBLICATIONS

U.S. Appl. No. 11/935,731 entitled "Motor Start Circuit" filed Nov. 6, 2007 in the name of Schmidt et al.

(Continued)

*Primary Examiner*—Rita Leykin
(74) *Attorney, Agent, or Firm*—McCormick, Paulding & Huber LLP

(57) ABSTRACT

The invention concerns a motor starter circuit for an induction motor, particularly a single-phase AC induction motor, with a main winding (4) and an auxiliary winding (5) supplied with current, particularly AC, via current supply connections (24, 25), and with a starter switch arrangement (15), which serves the purpose of interrupting the current flow through the auxiliary winding (5) after the start of the motor, the starter switch arrangement (15) interacting with a measuring arrangement serving the purpose of measuring the voltage across the auxiliary winding (5).

In order to optimise the motor starter circuit with regard to operation safety, a protection fuse (30) and a protection switch arrangement (47) are connected in series between the current supply connections (24, 25) so that, when the protection switch arrangement (47) is closed, the current flows in such a manner through the protection switch arrangement (47; 77) and the protection fuse (30) that the protection fuse (30) is triggered to interrupt the current flow.

13 Claims, 3 Drawing Sheets

U.S. PATENT DOCUMENTS

| | | | |
|---|---|---|---|
| 4,605,888 A | 8/1986 | Kim | 318/786 |
| 4,674,021 A | 6/1987 | Sachs | |
| 4,772,808 A | 9/1988 | Vial | |
| 4,782,278 A | 11/1988 | Bossi et al. | 318/786 |
| 4,786,850 A | 11/1988 | Chmiel | 318/786 |
| 4,820,964 A * | 4/1989 | Kadah et al. | 318/786 |
| 4,843,295 A * | 6/1989 | Thompson et al. | 318/786 |
| 4,862,053 A | 8/1989 | Jordan et al. | 318/786 |
| 5,041,771 A | 8/1991 | Min | 318/786 |
| 5,051,681 A | 9/1991 | Schwarz | 318/786 |
| 5,103,154 A | 4/1992 | Dropps et al. | |
| 5,296,795 A | 3/1994 | Dropps et al. | 318/778 |
| 5,302,885 A | 4/1994 | Schwarz et al. | 318/781 |
| 5,345,126 A * | 9/1994 | Bunch | 310/68 C |
| 5,488,834 A | 2/1996 | Schwarz | |
| 5,528,120 A * | 6/1996 | Brodetsky | 318/785 |
| 5,808,441 A | 9/1998 | Nehring | 318/751 |
| 5,818,122 A | 10/1998 | Miyazawa et al. | |
| 6,320,348 B1 | 11/2001 | Kadah | 318/785 |
| 6,982,539 B1 | 1/2006 | Ward | 318/778 |
| 6,989,649 B2 | 1/2006 | Mehlhorn | |
| 2004/0263109 A1 | 12/2004 | Schwarz | 318/778 |
| 2005/0184699 A1 | 8/2005 | Unno | 318/786 |

FOREIGN PATENT DOCUMENTS

| | | |
|---|---|---|
| DE | 19741828 | 3/1999 |
| DE | 102004018966 | 12/2005 |
| EP | 0 294 118 A2 | 12/1988 |
| EP | 0 571 956 B1 | 12/1993 |
| EP | 0 356 310 B1 | 3/1994 |
| EP | 0 802 621 B1 | 10/1997 |
| EP | 0924735 A2 | 6/1999 |
| EP | 1 315 279 A2 | 5/2003 |
| EP | 1494346 A2 | 1/2005 |
| EP | 1 240 709 | 11/2005 |
| EP | 1 619 786 A2 | 1/2006 |
| JP | 58-107069 | 6/1983 |
| JP | 60-32583 | 2/1985 |
| JP | 10-225 156 | 8/1998 |
| WO | 99/09575 A2 | 2/1999 |
| WO | 01/69147 A1 | 9/2001 |
| WO | 2006/001601 A1 | 1/2006 |

OTHER PUBLICATIONS

U.S. Appl. No. 11/776,246 entitled "Motor Start Circuit" filed Jul. 11, 2007 in the name of Schmidt et al.

Chapter 17, Transient Suppressors and Surge Suppressors, pp. 17-1 to 17-17; Robust Electronic Design Reference Book, vol. I, vol. 2, Appendices, 2004.

"Overvoltage Crowbar Sensing Circuit"; Publication No. MC3423/D, Mar. 2005—Rev. 5, pp. 1, 3 and 4.

"Over Voltage Protection"; http:/www.mitedu.freeserve.co.uk/Design/overvoltage.htm; pp. 1-2; Aug. 10, 2005.

* cited by examiner

MOTOR STARTER CIRCUIT

CROSS REFERENCE TO RELATED APPLICATIONS

Applicant hereby claims foreign priority benefits under U.S.C. § 119 from German Patent Application No. 10 2006 021 256.8 filed on Apr. 28, 2006, the contents of which are incorporated by reference herein.

FIELD OF THE INVENTION

The invention concerns a motor starter circuit for an induction motor, particularly a single-phase AC induction motor, with a main winding and an auxiliary winding supplied with current, particularly AC, via current supply connections, and with a starter switch arrangement, which serves the purpose of interrupting the current flow through the auxiliary winding after the start of the motor, the starter switch arrangement interacting with a measuring arrangement serving the purpose of measuring the voltage across the auxiliary winding.

BACKGROUND OF THE INVENTION

Traditional motor starter circuits are provided with a thermal circuit breaker, which is also called thermal switch or winding protection switch. In induction motors for compressors for domestic appliances or heat pumps for air-conditioning systems, the thermal switch can be located in a hermetically closed compressor housing. The thermal switch or winding protection switch is usually closed and serves the purpose of interrupting the current flow through the auxiliary winding and the main winding, if the rotor seizes and the power exceeds a permissible maximum value or too much heat is released in the winding. As general state of the art the documents DE 197 35 552 A1, EP 0 924 735 A3, U.S. Pat. No. 5,818,122 and JP 58107069 A are mentioned, which disclose different safety elements or safety switches for current circuits in vehicles, said elements or switches being connected to a vehicle battery.

SUMMARY OF THE INVENTION

The task of the invention is to provide a motor starter circuit according to the preamble of claim 1, and/or a circuit board with such a motor starter circuit with the purpose of optimising the safety of operation.

With a motor starter circuit for an induction motor, particularly a single-phase AC induction motor, with a main winding and an auxiliary winding supplied with current, particularly AC, via current supply connections, and with a starter switch arrangement, which serves the purpose of interrupting the current flow through the auxiliary winding after the start of the motor, the starter switch arrangement interacting with a measuring arrangement serving the purpose of measuring the voltage across the auxiliary winding the task mentioned above is solved in that between the current supply connections a protection fuse and a protection switch arrangement are connected in series with the current supply connections so that when the protection switch arrangement is closed, the current flows in such a manner through the protection switch arrangement and the protection fuse that the protection fuse is blown and so interrupts the current flow. The main winding is also called the run winding. The auxiliary winding is also called start winding. During operation of a traditional motor starter circuit it may happen that the starter switch arrangement does not open correctly and remains permanently closed. In this case a fault current will permanently flow through the auxiliary winding and the starter switch arrangement. This permanent current supply to the auxiliary winding and the starter switch arrangement may damage the auxiliary winding and/or the starter switch arrangement. Traditional thermal circuit breakers react too slowly and are not dimensioned for activation in case of errors in the starter switch arrangement. The protection fuse according to the invention ensures that the fault current caused by a malfunctioning starter switch arrangement only lasts for a short time, so that an undesired damaging of the auxiliary winding and/or the main winding and/or the starter switch arrangement is reliably avoided. This cannot be ensured by the traditional winding protection switch.

A preferred embodiment of the motor starter circuit is characterised in that the starter switch arrangement and the protection switch arrangement are connected to a control device controlling the function of both the starter switch arrangement and the protection switch arrangement. The control device, also called a controller, is, for example, an FPGA (Field Programmable Gate Array), an ASIC (Application-Specific Integrated Circuit), a microprocessor or a microcontroller.

A further preferred embodiment of the motor starter circuit is characterised in that the protection fuse and/or the protection switch arrangement is part of a replaceable component. The replacement of the replaceable component is obviously more cost effective and simple than a replacement of the whole motor.

A further preferred embodiment of the motor starter circuit is characterised in that the protection switch arrangement is formed by a protection relay. This protection relay can be a traditional protection relay.

A further preferred embodiment of the motor starter circuit is characterised in that protection switch arrangement is formed by a semi-conductor switch. The semi-conductor switch is, for example, a Triac or a FET (Field Effect Transistor).

The invention also concerns a method for starting an induction motor, particularly a single-phase AC induction motor with a motor starter circuit as described above. Before turning on the current supply, the protection switch arrangement is in the open state. According to an essential aspect of the invention, the protection switch arrangement is closed if the starter switch arrangement remains closed after a starting phase of the induction motor. This creates a current flow through the protection fuse that is so large that the current fuse blows, that is, opens to interrupt the current flow. This interrupts the current through the windings and the starter switch arrangement.

A preferred embodiment of the method is characterised in that the voltage across the closed starter switch arrangement is measured to determine, if the starter switch arrangement remains closed after the starting phase of the induction motor and/or if the starting phase of the induction motor has finished.

A further preferred embodiment of the method is characterised in that the protection switch arrangement is closed, when the voltage across the closed starter switch arrangement remains relatively low after the starting phase. During the starting phase the voltage across the starter switch arrangement is relatively low. During proper operation the voltage increases after the starting phase and is then relatively high. During normal operation the starter switch arrangement is opened. When the starter switch arrangement does not open correctly, and the voltage remains relatively low after the starting phase, this will, in accordance with the present invention, be interpreted as a fault, and the protection switch arrangement will be put into a closed state.

The invention also concerns a circuit board having a motor starter circuit as described above and working in accordance with a method as described above. The circuit board serves the purpose of carrying the electronic components.

A preferred embodiment of the circuit board is characterised in that the circuit board comprises a programmable chip. The design and the manufacturing of integrated circuits are well-known.

BRIEF DESCRIPTION OF THE DRAWINGS

Further advantages, features and details of the invention appear in the following description, in which different embodiments are described in detail with reference to the drawings, showing.

DETAILED DESCRIPTION OF THE INVENTION

Figure 1:
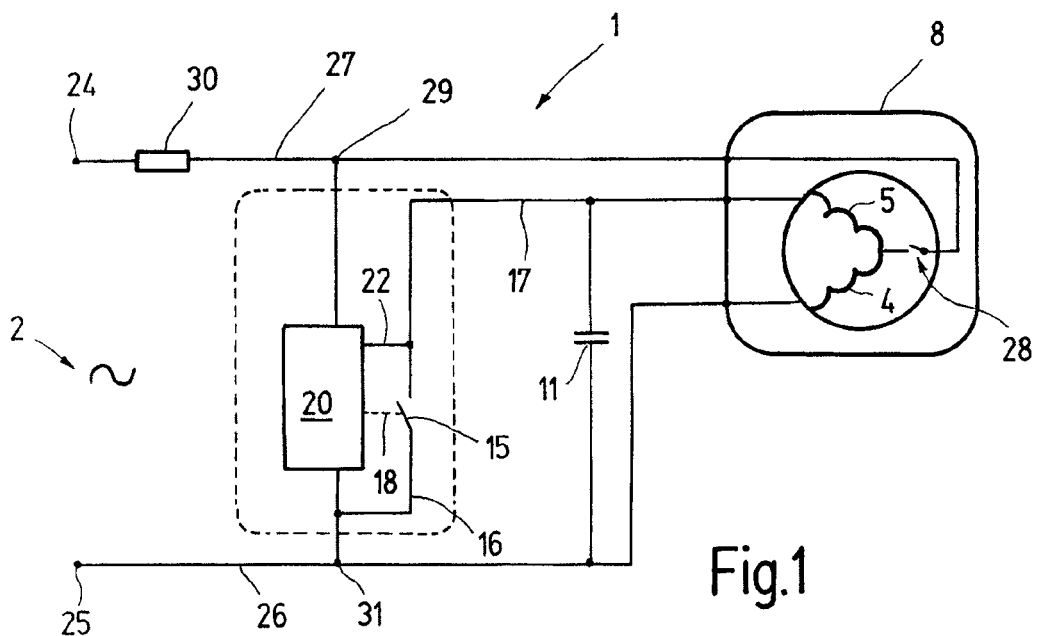
FIG. 1 is a circuit diagram of a motor starter circuit with a winding protection switch and an additional protection fuse.

FIG. 1 shows a motor starter circuit 1 in the form of a diagram. The motor starter circuit 1 comprises the electrical or electronic components, respectively, for starting and operating a single-phase AC induction motor, in the following called motor. The motor comprises a main winding 4 and an auxiliary winding 5, which are located in a hermetically closed compressor housing shown in the form of a square frame 8.

A run capacitor 11 is connected in series with the auxiliary winding 5. Further, a starter switch arrangement 15 is connected in series with the auxiliary winding 5. The starter switch arrangement 15 serves the purpose of interrupting a connection between a conductor 16 and a conductor 17. In the state shown, the connection between the conductors 16 and 17 is interrupted by the switch arrangement 15. The conductor 17 connects the starter switch arrangement 15 and, in the closed state of the starter switch arrangement, the conductor 16 with the auxiliary winding.

As known, single-phase AC induction motors comprise a stator and a rotor. A prerequisite for the formation of a rotating field in the stator is a delay in time of the current in the auxiliary winding in relation to the current in the main winding. The alternating fields forming in the main and auxiliary windings are thus offset in relation to each other in time and space and form a common rotating field. The rotating field causes a self-start of the motor. After start or run-up of the motor the auxiliary winding 5 is turned off by the starter switch arrangement 15. After turning off the auxiliary winding 5 the motor works like a starter motor.

The starter switch arrangement 15 is connected to a control device 20 via a control connection 18. Via a further conductor 22 and the conductor 17 the control device 20 is connected to the auxiliary winding 5. By means of the conductors 22 and 17 the voltage between a conductor node 31 and the conductor 22 can be determined by the control device 20.

A square frame 23 suggests that the control device 20 and the starter switch arrangement 15 are parts of a starter that serves the purpose of starting the motor. The current supply of the motor starter circuit 1 occurs through applying an AC voltage 2 to two current supply connections 24 and 25. The current supply connection 25 is connected to the control device 20, the run capacitor 11 and the main winding 4 by means of a conductor 26. The current supply connection 24 is connected to the control device 20, the run capacitor 11 and the two windings 4 and 5 via a conductor 27.

A winding protection switch 28 is connected in series with the two windings 4 and 5. During normal operation of the motor the winding protection switch 28 is closed. When the rotor seizes, this may cause the power to exceed a maximum permissible value and/or too great a release of heat. In such a case, the winding protection switch opens to prevent damage to the windings 4 and 5.

Two conductor nodes 29 and 31 are provided between the two current supply connections 24 and 25, the control device 20 being connected between said nodes 29 and 31. A protection fuse 30 is provided in the conductor 27 between the current supply connection 24 and the conductor node 29. The protection fuse serves the purpose of interrupting the current supply of the motor starter circuit 1, if the starter switch arrangement 15 does not open correctly and remains permanently closed. In this case a fault current will permanently flow through the closed switch arrangement 15 and the auxiliary winding 5. This permanent current flow may cause damage to the auxiliary winding 5 and/or the starter switch arrangement 15.

The winding protection switch 28 reacts too slowly and is not dimensioned to be activated in the case of a malfunctioning of the starter switch arrangement 15. By means of the protection fuse 30, according to the invention, it is ensured that the fault current caused by the malfunctioning starter switch arrangement 15 only lasts for a short period. The additional protection fuse 30 reacts faster than the winding protection switch 28 and ensures a fast interruption of the current flow, when a fault current occurs.

The FIGS. 2 to 5 show the motor starter circuits 41, 51, 61 and 71, which are similar to the motor starter circuit 1 shown in FIG. 1. Same parts or elements have the same reference numbers. To avoid repetitions, reference is made to the above description of FIG. 1. In the following mainly the differences between the individual embodiments will be explained.

Figure 2:
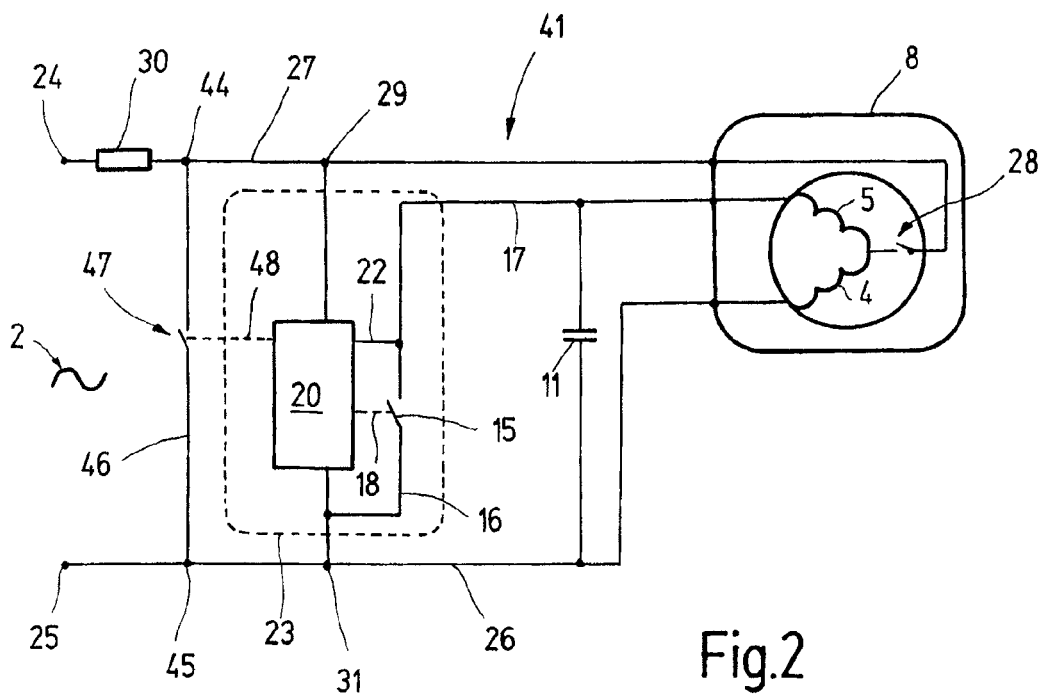
FIG. 2 is a motor starter circuit similar to that of FIG. 1 with a protection fuse and a protection switch arrangement.

In the embodiment shown in FIG. 2, a further conductor node 44 is provided between the protection fuse 30 and the conductor node 29. In the conductor 26 between the current supply connection 24 and the conductor node 31 another conductor node 45 is provided. The two conductor nodes 44 and 45 are connected to each other by a conductor 46, a protection switch arrangement 47 being located in said conductor 46. In the embodiment shown the protection switch arrangement 47 is open, so that the connection between the conductor nodes 44 and 45 through the conductor 46 is interrupted. The protection switch arrangement 47 is connected to the control device 20 by means of a control conductor 48.

When the motor is started, the protection switch arrangement 47 is in the open state. After turning on the current supply the voltage across the starter switch arrangement 15 is determined by the control device 20. During a so-called start phase, in which the motor is run up with the support through the auxiliary winding, the voltage across the starter switch arrangement 15 is relatively low. During normal operation the voltage increases, when the motor has run up, that is, when the start phase has ended, and is then relatively high. During normal operation the starter switch arrangement 15 is opened. When the starter switch arrangement 15 does not open and the voltage remains relatively low after the start phase, this is interpreted as a fault and the protection switch arrangement is placed in a closed state. Via the closed protection switch arrangement 47 a direct current flow between the current supply connections 24 and 25 through the protection fuse 30 is generated. This causes that the protection fuse 30 is blown or burns out, so that the current circuit is interrupted.

Figure 3:
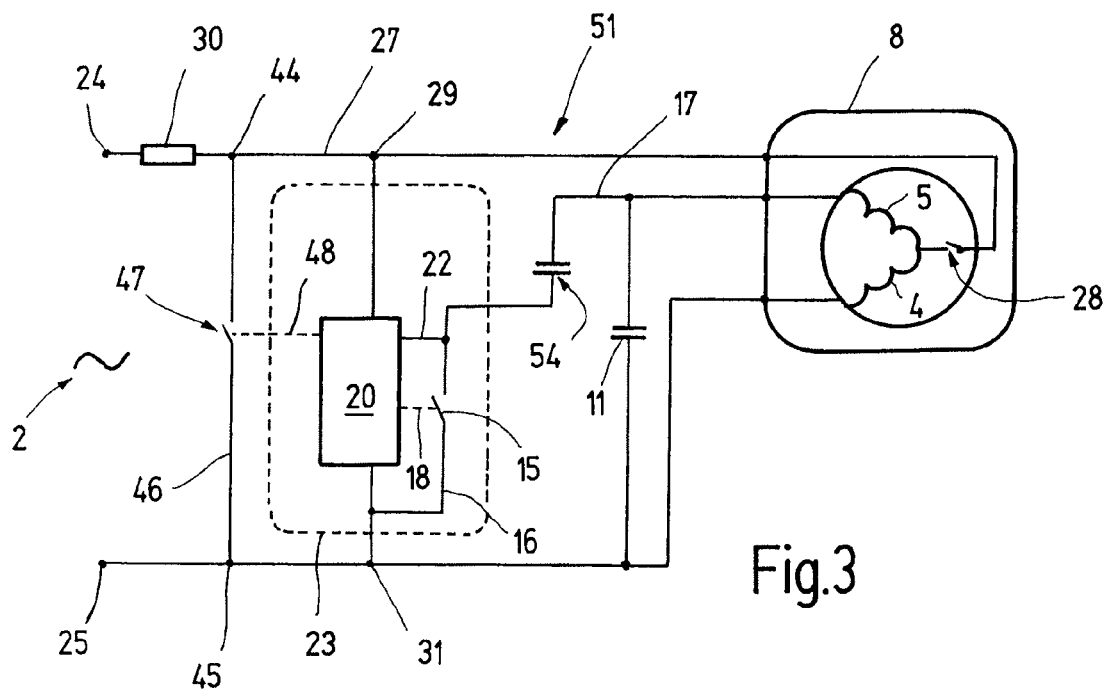
FIG. 3 is a motor starter circuit similar to that of FIG. 2 with a start capacitor and a run capacitor.

In the embodiment shown in FIG. 3 an additional start capacitor 54 is provided in the conductor 17. The start capacitor 54 serves the purpose of increasing the start torque. This provides the advantage that the motor can start under load. After the start or run-up of the motor the start capacitor 54 is turned off, so that only the run capacitor 11 is active. Turning off the start capacitor 54 occurs via the starter switch arrangement 15 and is required, as the high total capacity of start capacitor 54 and run capacitor 11 will cause a large current to flow through the auxiliary winding 5. During continuous operation this could cause overheating.

Figure 4:
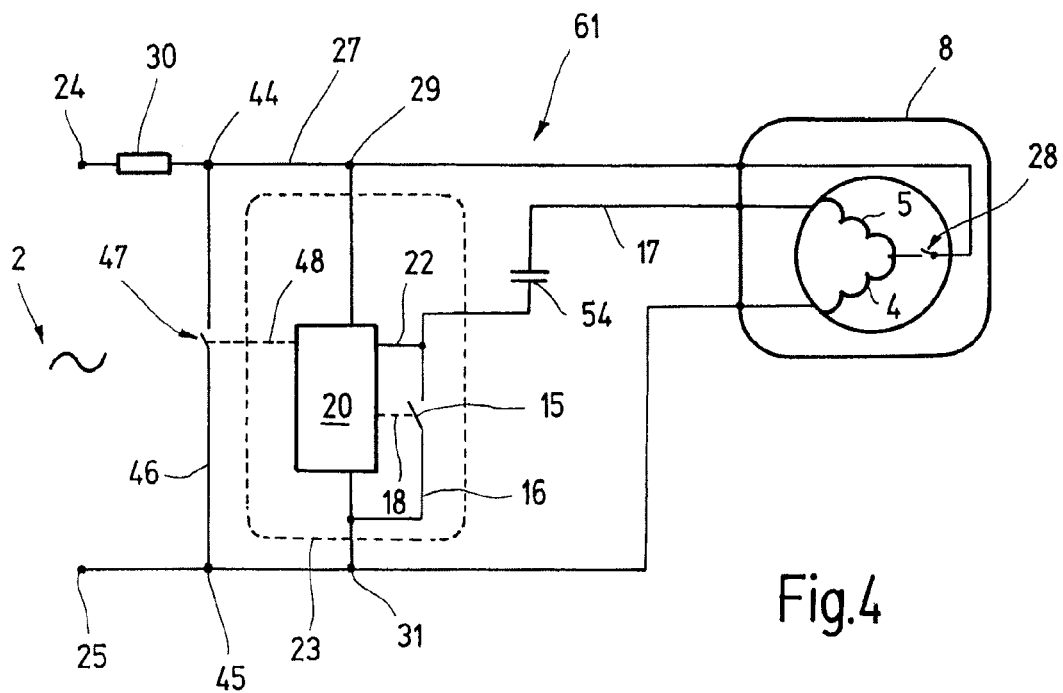
FIG. 4 is a motor starter circuit similar to that of FIG. 2 with a start capacitor.

In the motor starter circuit 61 shown in FIG. 4 only the start capacitor 54 is provided. A run capacitor (11 in FIG. 3) is not provided.

Figure 5:
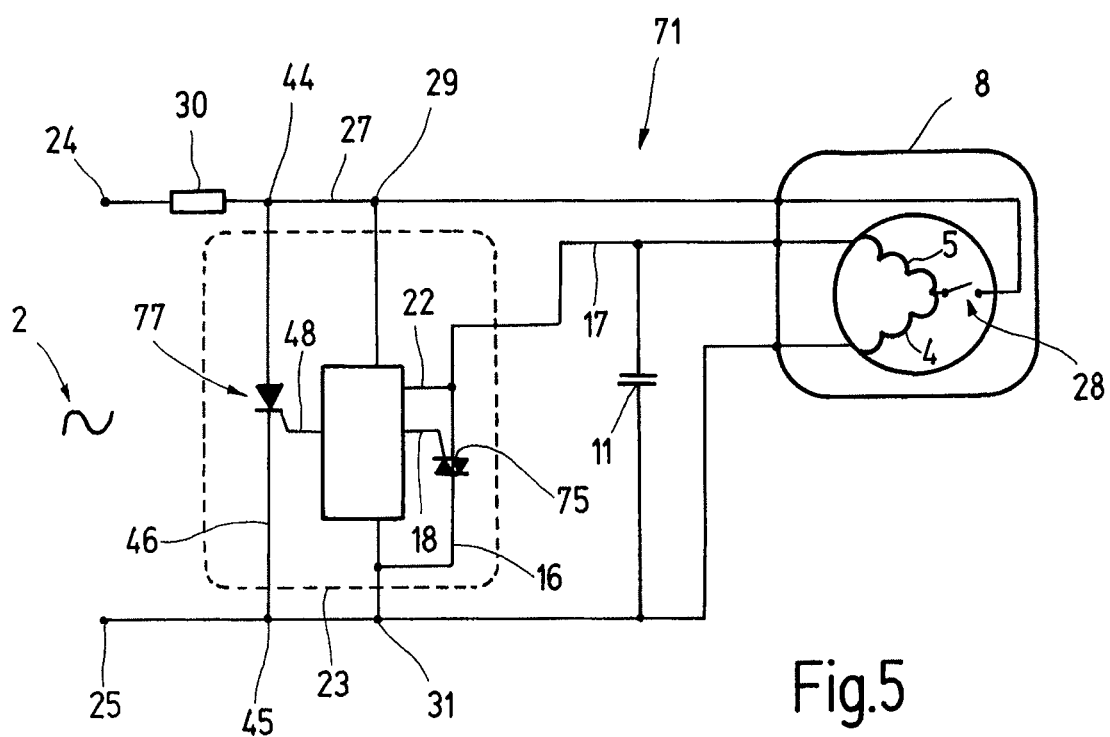
FIG. 5 is a motor starter circuit similar to that of FIG. 2 with semi-conductor circuit arrangements.

In the embodiment according to FIG. 5 only a run capacitor 11, but no start capacitor, is provided. Further, a semi-conductor start switch arrangement 75 and a semi-conductor protection switch arrangement 77 are provided in the motor starter circuit 71. The semi-conductor switch arrangements 75 and 77 are Triacs.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A motor starter circuit for an induction motor comprising a main winding and an auxiliary winding supplied with current, via current supply connections, and with a starter switch arrangement, which serves the purpose of interrupting the current flow through the auxiliary winding after the start of the motor, the starter switch arrangement interacting with a measuring arrangement serving the purpose of measuring the voltage across the auxiliary winding, wherein between the current supply connections a protection fuse and a protection switch arrangement are connected in series so that, when the protection switch arrangement is in a closed state, the current flows in such a manner through the protection switch arrangement and the protection fuse that the protection fuse is triggered to interrupt the current flow.

2. The motor starter circuit according to claim 1, wherein the starter switch arrangement and the protection switch arrangement are connected to a control device controlling the function of both the starter switch arrangement and the protection switch arrangement.

3. The motor starter circuit according to claim 1, wherein the protection fuse is part of a replaceable component.

4. The motor starter circuit according to claim 1, wherein the protection switch arrangement is formed by a protection relay.

5. The motor starter circuit according to claim 1, wherein protection switch arrangement is formed by a semi-conductor switch arrangement.

6. A method for starting an induction motor with a motor starter circuit according to claim 1, wherein the protection switch arrangement is in an open state, comprising:
putting the protection switch arrangement into a closed state if the starter switch arrangement remains in the closed state after the end of the starting phase of the induction motor, which creates a current flow through the protection fuse that is so large that the protection fuse blows, thereby interrupting the current flow.

7. The method according to claim 6, further comprising:
measuring the voltage across the starter switch arrangement in the closed state, and
determining if the starter switch arrangement remains in the closed state after the starting phase of the induction motor.

8. The method according to claim 6, wherein the protection switch arrangement is closed, if the voltage across the closed starter switch arrangement remains relatively low after the starting phase.

9. A circuit board having a motor starter circuit according to claim 1.

10. The circuit board according to claim 9, wherein the circuit board comprises a programmable chip.

11. The motor starter circuit according to claim 1, wherein the protection switch arrangement is part of a replaceable component.

12. The method according to claim 6, further comprising measuring the voltage across the starter switch arrangement in the closed state, and determining if the starting phase of the induction motor has finished.

13. A circuit board having a motor starter circuit for an induction motor comprising a main winding and an auxiliary winding supplied with current via current supply connections, and with a starter switch arrangement, which serves the purpose of interrupting the current flow through the auxiliary winding after the start of the motor, the starter switch arrangement interacting with a measuring arrangement serving the purpose of measuring the voltage across the auxiliary winding, wherein between the current supply connections a protection fuse and a protection switch arrangement are connected in series so that, when the protection switch arrangement is in a closed state, the current flows in such a manner through the protection switch arrangement and the protection fuse that the protection fuse is triggered to interrupt the current flow, wherein the motor starter circuit works in accordance with a method according to claim 6.

* * * * *